United States Patent
Thandaveswaran (10) Patent No.: US 8,611,268 B1
(45) Date of Patent: Dec. 17, 2013

(54) ACCESS POINT POWER SAVE MECHANISM FOR WIRELESS COMMUNICATION SYSTEMS

(75) Inventor: Subramania Sharma Thandaveswaran, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 13/088,081

(22) Filed: Apr. 15, 2011

(51) Int. Cl.
*G08C 17/00* (2006.01)

(52) U.S. Cl.
USPC ............... 370/311; 455/422.1; 455/552.1

(58) Field of Classification Search
USPC ............... 370/311; 455/422.1, 552.1
See application file for complete search history.

(56) References Cited

U.S. PATENT DOCUMENTS

| | | | |
|---|---|---|---|
| 6,421,714 B1 | 7/2002 | Rai et al. |
| 6,570,857 B1 | 5/2003 | Haartsen et al. |
| 6,580,704 B1 | 6/2003 | Wellig et al. |
| 6,829,493 B1 | 12/2004 | Hunzinger |
| 6,836,472 B2 | 12/2004 | O'Toole et al. |
| 7,260,068 B2 | 8/2007 | Hsieh et al. |
| RE40,032 E | 1/2008 | Van Bokhorst et al. |
| 7,457,271 B2 | 11/2008 | Donovan |
| 7,505,795 B1 | 3/2009 | Lim et al. |
| 7,567,815 B2 | 7/2009 | Nishikawa et al. |
| 7,577,114 B2 | 8/2009 | Hsieh et al. |
| 7,804,849 B2 | 9/2010 | Mahany et al. |
| 7,864,720 B2 | 1/2011 | Jeyaseelan |
| 7,916,663 B2 | 3/2011 | Yee |
| 7,978,638 B2 | 7/2011 | Kim et al. |
| 7,995,507 B2 | 8/2011 | Singh et al. |
| 8,014,370 B2 | 9/2011 | Banerjea et al. |
| 8,023,522 B2 | 9/2011 | Gobriel et al. |
| 8,045,494 B2 | 10/2011 | Habetha et al. |
| 8,072,913 B2 | 12/2011 | Desai |
| 8,098,635 B2 | 1/2012 | Montojo et al. |
| 8,099,047 B2 | 1/2012 | David et al. |
| 8,112,650 B2 | 2/2012 | Qing et al. |
| 8,233,462 B2 | 7/2012 | Walton et al. |
| 8,526,346 B1 | 9/2013 | Liu |

(Continued)

FOREIGN PATENT DOCUMENTS

| | | |
|---|---|---|
| EP | 2157739 A1 | 2/2010 |
| WO | 2012078379 A1 | 6/2012 |

OTHER PUBLICATIONS

"U.S. Appl. No. 12/562,819 Office Action", Feb. 5, 2013, 29 pages.

(Continued)

*Primary Examiner* — Albert T Chou
(74) *Attorney, Agent, or Firm* — DeLizio Gilliam, PLLC (57) ABSTRACT

Power saving mechanisms can be implemented in an access point to improve power consumption. The access point can be configured to switch from an active power mode to a power save mode in response to not detecting communication activity for at least a predetermined idle time interval. In the power save mode, one or more sleep sub-states and one or more awake sub-states are initiated at the access point. During each awake sub-state, it is determined whether the awake sub-state coincides with a beacon transmission time instant. The access point broadcasts a probe response message if the awake sub-state does not coincide with the beacon transmission time instant. The access point broadcasts a beacon message if the awake sub-state coincides with the beacon transmission time instant.

21 Claims, 6 Drawing Sheets

(56) References Cited

U.S. PATENT DOCUMENTS

| | | |
|---|---|---|
| 8,537,733 B1 | 9/2013 | Panneerselvam et al. |
| 8,542,620 B2 | 9/2013 | Sampathkumar |
| 2002/0045435 A1 | 4/2002 | Fantaske |
| 2002/0164963 A1 | 11/2002 | Tehrani et al. |
| 2005/0135284 A1 | 6/2005 | Nanda et al. |
| 2005/0136914 A1 | 6/2005 | Van Kampen et al. |
| 2005/0152324 A1 | 7/2005 | Benveniste |
| 2005/0286454 A1 | 12/2005 | Morimoto et al. |
| 2006/0029024 A1 | 2/2006 | Zeng et al. |
| 2007/0077936 A1 | 4/2007 | Tomisawa et al. |
| 2007/0171910 A1 | 7/2007 | Kumar |
| 2008/0069021 A1* | 3/2008 | Chhabra ............... 370/311 |
| 2009/0016248 A1 | 1/2009 | Li et al. |
| 2009/0073945 A1 | 3/2009 | Seok |
| 2009/0097438 A1 | 4/2009 | Kneckt et al. |
| 2009/0196211 A1 | 8/2009 | Wentink |
| 2009/0310578 A1 | 12/2009 | Convertino et al. |
| 2010/0070767 A1 | 3/2010 | Walker et al. |
| 2010/0118797 A1 | 5/2010 | Park et al. |
| 2010/0128701 A1 | 5/2010 | Nagaraja |
| 2010/0153727 A1 | 6/2010 | Reznik et al. |
| 2010/0189021 A1 | 7/2010 | He et al. |
| 2010/0254290 A1 | 10/2010 | Gong et al. |
| 2010/0284316 A1 | 11/2010 | Sampathkumar |
| 2010/0325459 A1 | 12/2010 | Kangude et al. |
| 2011/0051638 A1* | 3/2011 | Jeon et al. ............... 370/311 |
| 2011/0086662 A1 | 4/2011 | Fong et al. |
| 2011/0158142 A1 | 6/2011 | Gong et al. |
| 2011/0237294 A1* | 9/2011 | Hussain ............... 455/552.1 |
| 2011/0280170 A1* | 11/2011 | Bowser et al. ............... 370/311 |
| 2012/0021735 A1* | 1/2012 | Maeder et al. ............... 455/422.1 |
| 2012/0151089 A1 | 6/2012 | Ponmudi et al. |
| 2013/0028206 A1 | 1/2013 | Cho et al. |
| 2013/0204936 A1 | 8/2013 | El et al. |
| 2013/0238919 A1 | 9/2013 | Ponmudi et al. |

OTHER PUBLICATIONS

"U.S. Appl. No. 12/727,610 Final Office Action", Jan. 7, 2013, 24 pages.
"U.S. Appl. No. 12/768,434 Final Office Action", Mar. 20, 2013, 15 Pages.
"U.S. Appl. No. 12/768,912 Final Office Action", Feb. 22, 2013, 27 Pages.
Co-pending U.S. Appl. No. 12/562,819, filed Sep. 18, 2009.
Co-pending U.S. Appl. No 12/705,267, filed Feb. 12, 2010.
Co-pending U.S. Appl. No. 12/727,610, filed Mar. 19, 2010.
Co-pending U.S. Appl. No. 12/768,434, filed Apr. 27, 2010.
Co-pending U.S. Appl. No. 12/768,912, filed Apr. 28, 2010.
Co-pending U.S. Appl. No. 12/963,160, filed Dec. 8, 2010.
Co-pending U.S. Appl. No. 13/413,011, filed Mar. 6, 2012.
IEEE Standard for Information technology—Telecommunications and information exchange between systems—Local and metropolitan area networks—Specific requirements—Part 11: Wireless LAN Medium Access Control (MAC) and Physical Layer (PHY) Specifications, IEEE Std 802.11-2007 (Revision of IEEE Std 802.11-1999) http://standards.ieee.org/getieee802/download/802.11-2007.pdf. (Date Obtained from Internet Oct. 21, 2009) Jun. 12, 2007, pp. 59-312.
"IEEE Std 802.11z: IEEE Standard for Information Technology—Amendment 7: Extensions to Direct-Link Setup", IEEE Computer Society 3 Park Avenue New York, NY 10016-5997 http://ieeexplore.ieee.org/xpl/freeabs alljsp"amumber=5605400 Oct. 14, 2010, 96 pages.
IEEE, "Wireless LAN Medium Access Control (MAC) and Physical Layer (PHY) Specifications", IEEE Standard for Information Technology Section 11.0, http://standards.ieee.org/getieee802/download/802.11-2007.pdf Jun. 12, 2007, pp. 419-468.
Jung Eun-Sun et al., "A Power Control MAC Protocol for Ad Hoc Networks", 2002, 12 pages.
"U.S. Appl. No. 12/492,405 Office Action", Mar. 15, 2012, 9 pages.
U.S. Appl. No. 12/492,405 Office Action, Sep. 27, 2012, 10 Pages.
U.S. Appl. No. 12/562,819 Final Office Action, May 3, 2012, 31 pages.
"U.S. Appl. No. 12/562,819 Office Action", Nov. 14, 2011, 26 pages.
"U.S. Appl. No. 12/705,267 Office Action", Mar. 22, 2012, 11 pages.
U.S. Appl. No. 12/727,610 Office Action, Aug. 2, 2012, 20 Pages.
"U.S. Appl. No. 12/768,434 Office Action", Oct. 15, 2012, 11 pages.
U.S. Appl. No. 12/768,912 Office Action, Sep. 7, 2012, 23 Pages.
"PCT Application No. PCT/US2011/062154 International Search Report", Mar. 6, 2012, 13 pages.
"PCT Application No. PCT/US2013/029377 International Search Report", Jun. 17, 2013, 11 pages.
"U.S. Appl. No. 12/963,160 Office Action", Apr. 16, 2013, 25 pages.
PCT Application No. PCT/US11/62154 International Preliminary Report on Patentability, Jun. 20, 2013, 8 pages.
"U.S. Appl. No. 12/963,160 Final Office Action", Aug. 15, 2013, 19 pages.
Co-pending U.S. Appl. No. 13/966,870, filed Aug. 14, 2013, 47 pages.
Co-pending U.S. Appl. No. 14/049,661, filed Oct. 9, 2013, 32 pages.

* cited by examiner

ACCESS POINT POWER SAVE MECHANISM FOR WIRELESS COMMUNICATION SYSTEMS

BACKGROUND

Embodiments of the inventive subject matter generally relate to the field of communication systems and, more particularly, to an access point power save mechanism for wireless communication systems.

Access points enable client network devices to connect to and transmit information via a communication network. Mobile access points allow for continuous connectivity to the communication network (such as the Internet) without being restrained by the coverage area of a fixed access point. However, because mobile access points typically run on batteries, mobile access points can only operate for a limited amount of time without an external power source. Energy saving mechanisms can be implemented in mobile access points to improve battery life.

SUMMARY

Various embodiments of an access point power save mechanism for wireless communication systems are disclosed. In one embodiment, the access point switches from an active power mode to a power save mode in response to not detecting communication activity associated with the access point for at least a predetermined idle time interval threshold. One or more sleep sub-states and one or more awake sub-states are initiated during the power save mode of the access point. It is determined, for each of the one or more awake sub-states associated with the power save mode, whether the awake sub-state coincides with a beacon transmission time instant associated with the access point. A probe response message associated with the access point is broadcast during the awake sub-state in response to determining that the awake sub-state does not coincide with the beacon transmission time instant. A beacon message associated with the access point is broadcast during the awake sub-state in response to determining that the awake sub-state coincides with the beacon transmission time instant.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to a power save mechanism implemented by a wireless local area network (WLAN) access point, embodiments are not so limited. In other embodiments, the power save mechanism described herein can be implemented for other suitable standards and devices (e.g., Worldwide Interoperability for Microwave Access (WiMAX)). In other instances, well-known instruction instances, protocols, structures, and techniques have not been shown in detail in order not to obfuscate the description.

Traditionally, access points have been based on a connectivity model that requires the access points to continuously remain in an active power state and remain available to communicate with one or more client devices ("fully active power mode"). Traditional access points are typically fixed access points and are connected to an electrical outlet. On the other hand, mobile access points (e.g., mobile phones that include software/hardware to operate as access points in certain modes of operation) are typically battery powered. The mobile access points can provide portability and the ability to connect to a communication network (e.g., the Internet) at any time. However, the access point connectivity model that requires the access point to continuously remain in the fully active power mode and the mobile access point's limited battery capacity can impact power consumption, can reduce battery life, and can reduce the time that the mobile access point can be used.

Power saving mechanisms can be implemented on the access point by altering the connectivity model that requires the access point to always remain in the fully active power mode. In some embodiments, instead of continuously remaining in the fully active power mode, the access point can be configured to switch to a partial active power save mode. The access point can switch from the fully active power mode to the partial active power save mode and vice versa, depending on whether communication activity is detected at the access point. For example, on determining that no communication activity was detected at the access point for an idle time interval threshold, the access point can be prompted to switch from the fully active power mode to the partial active power save mode. In the partial active power save mode, the access point can be configured to alternate between an active awake sub-state (for transmitting beacon messages for maintaining communication link connectivity, for synchronization, for advertising the existence of the access point, etc.) and an inactive sleep sub-state (where power to processing components of the access point is minimized or disconnected). Causing the access point to switch to the partial active power save mode when no communication activity is detected at the access point for at least the idle time interval threshold can enable the access point to conserve power, thus prolonging battery life.

Figure 1:
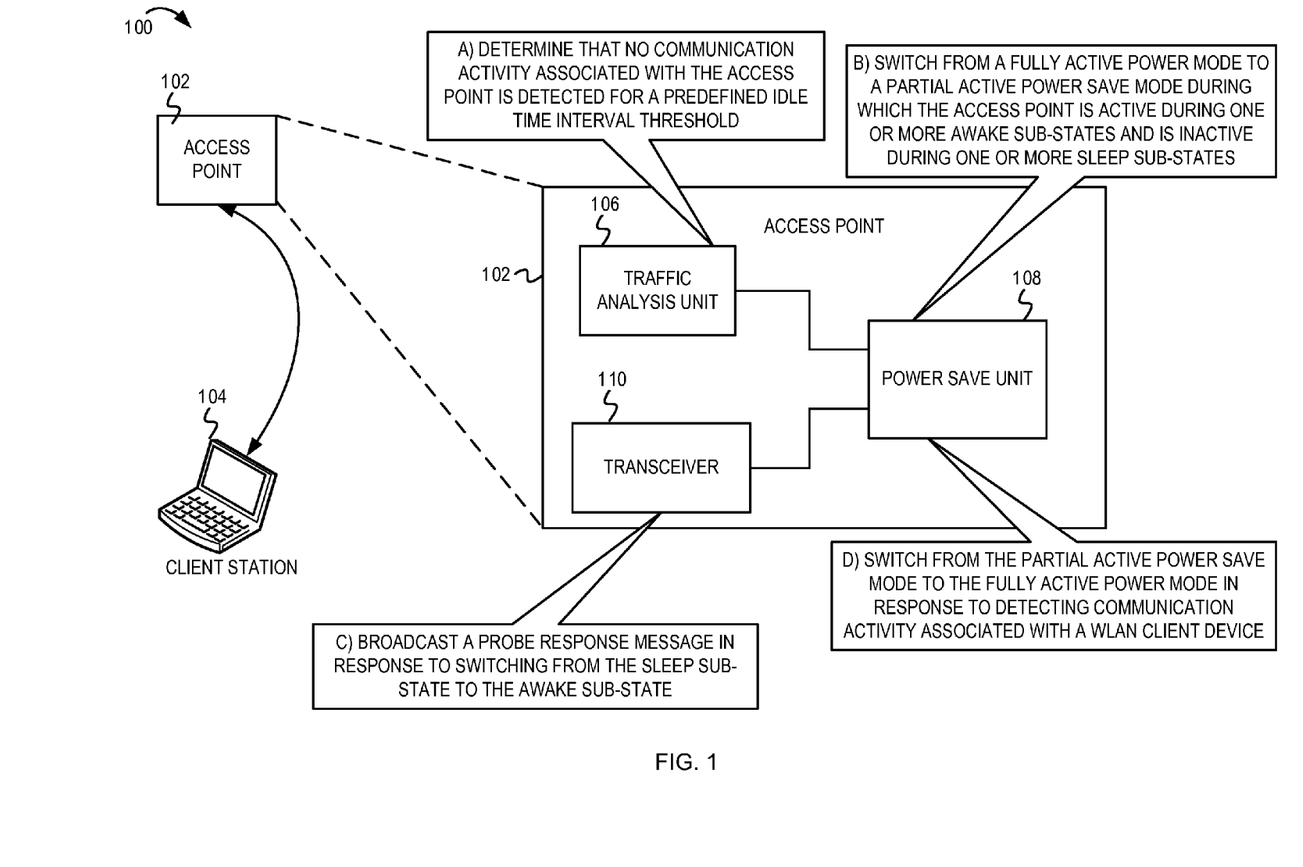
FIG. 1 is an example conceptual diagram illustrating an access point power save mechanism in a wireless communication network.

FIG. 1 is an example conceptual diagram illustrating an access point power save mechanism in a wireless communication network 100. The wireless communication network 100 comprises an access point 102 coupled with a client station 104. The access point 102 comprises a traffic analysis unit 106, a power save unit 108, and a transceiver 110. In one implementation, the wireless communication network 100 can be a wireless local area network (WLAN). The access point 102 can be a mobile WLAN access point, a traditional WLAN access point, or another suitable electronic device capable of operating as a WLAN access point (soft access point or SoftAP). Likewise, the client station 104 can be a WLAN client device that connects to the WLAN access point 102. As will be described herein, the access point 102 can operate in one of two power modes—a fully active power mode and a partial active power save mode. In the fully active power mode, the access point 102 continuously remains in an active power state to communicate with the client station 104. In the partial active power save mode, the access point 102 alternates between an awake sub-state (for transmitting beacons and for listening for messages from other WLAN devices) and a sleep sub-state (where the access point 102 is inactive). Furthermore, the access point 102 can alternate between the fully active power mode and the partial active power save mode depending on whether communication activity is detected at the access point 102, as will be described with reference to stages A-D.

At stage A, the traffic analysis unit 106 determines that no communication activity associated with the access point 102 was detected for a predefined idle time interval threshold. As will be further described with reference to FIG. 2, the traffic analysis unit 106 can keep track of a time instant at which communication activity (e.g., WLAN packets buffered and scheduled to be transmitted by the access point 102, WLAN packets received at the access point, etc.) was last detected at the access point 102. The traffic analysis unit 106 can also determine the time interval for which no communication activity was detected at the access point 102. The traffic analysis unit 106 can periodically compare the time interval for which no communication activity was detected at the access point 102 with the predefined idle time interval threshold. The traffic analysis unit 106 can notify the power save unit 108 in response to determining the absence of communication activity associated with the access point 102 for the predefined idle time interval threshold.

At stage B, in response to determining that no communication activity associated with the access point was detected for the predefined idle time interval threshold, the power save unit 108 causes the access point 102 to switch from the fully active power mode to the partial active power save mode. For example, the power save unit 108 can determine whether data packets are received at the access point or whether there is buffered data for the client station 104, and can cause the access point 102 to switch to the partial active power save mode if no data packets are received and there is no buffered data for the connected client station 104. In the partial active power save mode, the access point 102 is active during one or more awake sub-states and is inactive during one or more sleep sub-states. The power save unit 108 can divide each beacon interval associated with the access point 102 into one or more awake sub-states and one or more sleep sub-states. When configured in the partial active power save mode, the access point 102 alternates between the awake sub-state and the sleep sub-state, as depicted with reference to the timing diagrams of FIG. 5. In other words, the awake sub-states and the sleep sub-states can be consecutive and periodically repeating time intervals within the beacon interval. The power save unit 108 can further divide the beacon interval into multiple power save timeslots. Each power save timeslot can comprise any suitable time duration measured in time units (TU) (e.g., microseconds, or another suitable format). In one example, each power save timeslot can comprise 10 TU (i.e., 10×1024 microseconds). Thus, if the beacon interval associated with the access point 102 is 102.4 milliseconds (ms), the power save unit 108 can divide the beacon interval into 10 power save timeslots. The power save unit 108 can then identify one or more power save timeslots ("awake cycles") during which the access point 102 should operate in the awake sub-state and one or more power save timeslots ("sleep cycles") during which the access point 102 should operate in the sleep sub-state. For example, the power save unit 108 can determine that the access point 102 should switch to the awake sub-state for 1 power save timeslot (or for 1 awake cycle) and should switch to the sleep sub-state for 2 consecutive power save timeslots (or for 2 sleep cycles). In other words, the awake sub-state (or the sleep sub-state) can comprise a collection of consecutive power save timeslots for which the access point is in the active power state (or the inactive power state). With reference to the above example, where the power save unit 108 determines that the access point 102 should switch to the awake sub-state for 1 awake cycle and switch to the sleep sub-state for 2 sleep cycles, each of the one or more awake sub-states comprises 1 active cycle and each of the one or more sleep sub-states comprises 2 sleep cycles.

In one implementation, the power save unit 108 can maintain a power state variable to track the current power state of the access point 102. For example, if the power state variable comprises a value of "1," the power save unit 108 can determine that the access point 102 is operating in the fully active power mode. If the power state variable comprises a value of "0," the power save unit 108 can determine that the access point 102 is operating in the partial active power save mode. In some implementations, the power save unit 108 can keep track of the number of sleep cycles and the number of awake cycles that have been initiated. For example, if the power save unit 108 determines that the access point 102 should initiate 3 sleep cycles per sleep sub-state (i.e., remain in the inactive power state for 3 power save timeslots), the power save unit 108 can maintain a counter to determine when the 3 sleep cycles have elapsed or can maintain a timer to determine when/whether to transition from the sleep sub-state to the awake sub-state.

At stage C, the transceiver 110 broadcasts a probe response message in response to the access point 102 switching from the sleep sub-state to the awake sub-state. In the sleep sub-state, power to various processing components (e.g., the transceiver 110) of the access point 102 may be disconnected for power conservation. Therefore, the access point 102 may not transmit or receive any data/control/management packets during the sleep sub-state. Consequently, in the sleep sub-state, the access point 102 may not receive (and not respond to) packets transmitted by connected client stations 104 or stations attempting to connect to the access point 102. After the access point 102 switches to the awake sub-state, the power save unit 108 can cause the transceiver 110 to broadcast a probe response message to indicate that the access point 102 is still available to communicate (or establish a connection) with other client stations. Broadcasting the probe response message every time the access point 102 switches from the sleep sub-state to the awake sub-state can enable the access point 102 to account for any probe request messages that were transmitted during the access point's sleep sub-state and, therefore, were not received by the access point 102. It is noted that if the first awake cycle of the awake sub-state coincides with the time to transmit a beacon message (e.g., the target beacon transmission time or TBTT), the power save unit 108 can cause the transceiver 110 to broadcast the beacon message instead of the probe response message. Following the awake sub-state and the transmission of either the probe response message or the beacon message, the power save unit 108 can cause the access point 102 to switch to the sleep sub-state and to initiate one or more sleep cycles that constitute the sleep sub-state. As will be described with reference to stage D, the power save unit 108 can cause the access point 102 to remain in the partial active power save mode until communication activity is detected at the access point 102.

At stage D, the power save unit 108 causes the access point 102 to switch from the partial active power save mode to the fully active power mode in response to detecting communication activity associated with the client station 104. For example, the power save unit 108 can cause the access point 102 to switch to the fully active power mode if data packets are received at the access point and/or there is buffered data (e.g., data frames received via a WLAN interface or a non-WLAN interface, data frames generated by the access point 102, etc.) intended for the client station 104 (and/or if other communication activity is detected). As described above, in the partial active power save mode, the access point 102 broadcasts beacon messages and probe response messages to maintain connectivity to connected client stations 104 and to advertise its presence to client stations attempting to connect to the access point 102. However, the access point 102 does not initiate any other data/control/management packet transmissions in the partial active power save mode. As will be further described with reference to FIGS. 2-4, on receiving data/control/management packets (e.g., probe/association/authentication request messages, data packets intended for the access point 102, etc.) at the access point 102 or on determining to transmit data/control/management packets (e.g., association/authentication/directed probe response messages, data packets intended for the client station 104, etc.), the power save unit 108 can cause the access point 102 to switch from the partial active power save mode to fully active awake mode.

Figure 2:
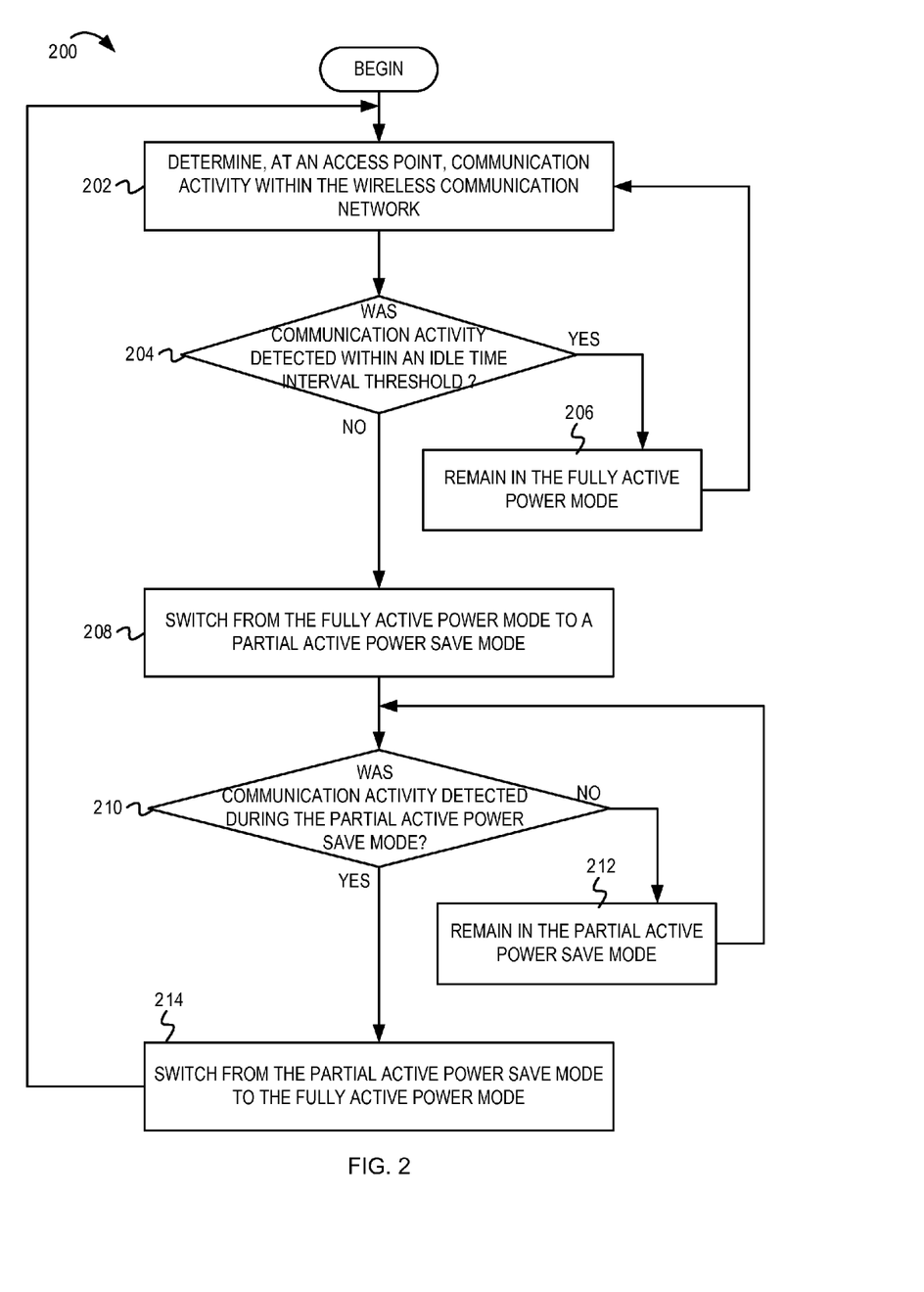
FIG. 2 is a flow diagram illustrating example operations of an access point implementing a power save mechanism.

FIG. 2 is a flow diagram ("flow") 200 illustrating example operations of an access point implementing a power save mechanism. The flow 200 begins at block 202.

At block 202, an access point determines communication activity within a wireless communication network. For example, with reference to FIG. 1, the traffic analysis unit 106 of the access point 102 can determine the communication activity within the wireless communication network 100. In one implementation, the traffic analysis unit 106 may record the time instants at which the access point 102 transmitted or received data/control/management packets. In another implementation, the traffic analysis unit 106 can maintain a communication time instant variable that is updated each time a WLAN packet is transmitted or received by the access point 102. The traffic analysis unit 106 may also keep track of a time period for which the access point 102 was idle ("access point idle time interval"). In other words, the traffic analysis unit 106 may keep track of the time period for which the access point 102 neither transmitted packets to other WLAN devices in the wireless communication network 100 nor received packets from the WLAN devices. The traffic analysis unit 106 can calculate the access point idle time interval as the time period between the time instant at which a WLAN packet was last transmitted/received (e.g., determined from the communication time instant variable) and the current time instant. In determining the access point idle time interval, the traffic analysis unit 106 can ignore beacon transmissions of the access point 102. In other words, the traffic analysis unit 106 can consider the access point 102 to be idle if the only communication activity detected at the access point 102 was the access point 102 transmitting a beacon message every predetermined beacon interval. The flow continues at block 204.

At block 204, it is determined whether communication activity was detected within a predefined idle time interval threshold. For example, the traffic analysis unit 106 can determine whether communication activity was detected at the access point 102 within the predefined idle time interval threshold. The traffic analysis unit 106 can compare the access point idle time interval (calculated at block 202) against the predefined idle time interval threshold to determine whether the access point 102 was idle (with the exception of periodically transmitting the beacon message) for a sufficient time period. The predefined idle time interval threshold can be representative of the amount of time for which the access point 102 should remain idle (i.e., not transmit or receive WLAN packets) before the access point 102 can switch to the partial active power save mode. In one implementation, the predefined idle time interval threshold can be determined based, at least in part, on the beacon interval associated with the access point 102, a maximum number of WLAN client devices that can connect to the access point 102, a time interval required by the access point 102 to transition from a low powered (or off) state to a high powered (or active) state, and/or other criteria. If it is determined that communication activity was detected at the access point 102 within the predefined idle time interval threshold, the flow continues at block 206. Otherwise, the flow continues at block 208.

At block 206, the access point remains in the fully active power mode. The flow 200 moves from block 204 to block 206 if the traffic analysis unit 106 determines that communication activity was detected at the access point 102 within the predefined idle time interval threshold (i.e., that the access point idle time interval was less than the predefined idle time interval threshold). In one implementation, the traffic analysis unit 106 may transmit a notification to the power save unit 108 indicating that the access point 102 should not switch to the partial active power save mode and that the access point 102 should remain in the fully active power mode. In another implementation, the traffic analysis unit 106 may not transmit any notification to the power save unit 108 if the traffic analysis unit 106 determines that the access point 102 should maintain its current state and remain in the fully active power mode. The flow 200 loops back to block 202 where the traffic analysis unit 106 continues to analyze the communication activity within the wireless communication network 100.

At block 208, the access point switches from the fully active power mode to a partial active power save mode. The flow 200 moves from block 204 to block 208 if the traffic analysis unit 106 determines that communication activity was not detected at the access point 102 within the predefined idle time interval threshold (i.e., that the access point idle time interval was greater than or equal to the predefined idle time interval threshold). The traffic analysis unit 106 may transmit a notification to the power save unit 108 indicating that the access point 102 should switch to the partial active power save mode from the fully active power mode. The power save unit 108, in turn, can cause processing components of the access point 102 to switch to the partial active power save mode. In some implementations, the power save unit 108 may cause the access point 102 to switch from the fully active power mode to the partial active power save mode during a subsequent beacon interval. In the subsequent beacon interval, after the access point 102 transmits the beacon message, the power save unit 108 may cause the processing components of the access point 102 to switch to the partial active power save mode. In other implementations, the power save unit 108 may cause the access point 102 to switch to the partial active power save mode as soon as it is determined that the access point 102 should switch to the partial active power save mode (e.g., in response to receiving the notification from the traffic analysis unit 106). In the partial active power save mode, each beacon interval can be sub-divided into one or more awake sub-states and one or more sleep sub-states. The power save unit 108 can cause the processing components of the access point 102 to alternate between an awake sub-state and a sleep sub-state. The awake sub-state can be a low power mode, where the access point 102 is configured to broadcast probe response messages and beacon messages for maintaining communication link connectivity and advertising its existence. In the awake sub-state, the access point 102 can also listen for messages (e.g., data messages) from other WLAN devices connected to or attempting to connect to the access point 102. The sleep sub-state can be an inactive power mode, where power supply to one or more processing components of the access point 102 is disconnected. Typically, the access point 102 may not transmit or receive any data/control/management packets while the access point 102 is in the sleep sub-state. Operations of the access point 102 in the partial active power save mode will further be described with reference to FIGS. 3-5. The flow continues at block 210.

At block 210, it is determined whether communication activity was detected during the partial active power save mode. For example, the traffic analysis unit 106 can determine whether communication activity was detected at the access point 102 during the partial active power save mode. The traffic analysis unit 106 can transmit a notification to the power save unit 108 in response to detecting the communication activity at the access point 102. For example, the traffic analysis unit 106 can transmit a notification to the power save unit 108 in response to determining that the access point 102 received data/control/management packets. As another example, the traffic analysis unit 106 can transmit a notification to the power save unit 108 in response to determining that the access point is scheduled to transmit data/control/management packets to client devices 104. If it is determined that communication activity was detected during the partial active power save mode, the flow continues at block 214. Otherwise, the flow continues at block 212.

At block 212, the access point remains in the partial active power save mode. The flow 200 moves from block 210 to block 212 if the traffic analysis unit 106 determines that no communication activity was detected at the access point 102 during the partial active power save mode. In one implementation, the traffic analysis unit 106 may not transmit any notification to the power save unit 108 if the traffic analysis unit 106 determines that the access point 102 should maintain its current state and remain in the partial active power save mode. In another implementation, the traffic analysis unit 106 may periodically transmit a notification to the power save unit 108 indicating that the access point 102 should remain in the partial active power save mode. The flow 200 loops back to block 210 where the traffic analysis unit 106 continues to determine whether communication activity was detected at the access point 102 during the partial active power save mode.

At block 214, the access point switches from the partial active power save mode to the fully active power mode. As described above, in the fully active power mode, the access point 102 continuously operates in the active (or high-powered) state. In other words, the access point 102 (i.e., the processing components of the access point 102) may not switch to a low-powered or an inactive state when the access point 102 is configured in the fully active power mode. The flow 200 moves from block 210 to block 214 if the traffic analysis unit 106 determines that communication activity was detected at the access point 102 during the partial active power save mode. The traffic analysis unit 106 may transmit a notification to the power save unit 108 indicating that communication activity was detected at the access point 102. Accordingly, the power save unit 108 can determine that the access point 102 should switch from the partial active power save mode to the fully active power mode. The power save unit 108 can cause the processing components of the access point 102 to switch to the fully active power mode. It is noted that although the access point 102 can receive WLAN packets in the partial active power save mode, the access point 102 transitions to the fully active power mode before transmitting a response to the WLAN packets received from other WLAN devices in the wireless communication network 100. For example, the power save unit 108 can cause the access point 102 to switch from the partial active power save mode to the fully active power mode if the access point 102 receives WLAN data packets from a WLAN client device. As another example, the power save unit 108 can cause the access point 102 to switch to the fully active power mode if the access point 102 has data buffered for a WLAN client device 104 which is in the inactive state and/or if the power save unit 108 expects the access point 102 to receive a request (e.g., a PSPOLL message) from the WLAN client device 104 for data intended for the WLAN client device 104. As another example, the power save unit 108 can cause the access point 102 to switch to the fully active power mode if it is determined that the access point 102 is scheduled to transmit unicast/multicast/broadcast packets to one or more WLAN client devices. As will further be described with reference to FIGS. 3-4, the access point 102 may only receive WLAN packets when the access point 102 operates in the awake sub-state of the partial active power save mode. The access point 102 may not receive WLAN packets when the access point 102 operates in the sleep sub-state of the partial active power save mode. From block 214, the flow ends.

Figure 3:
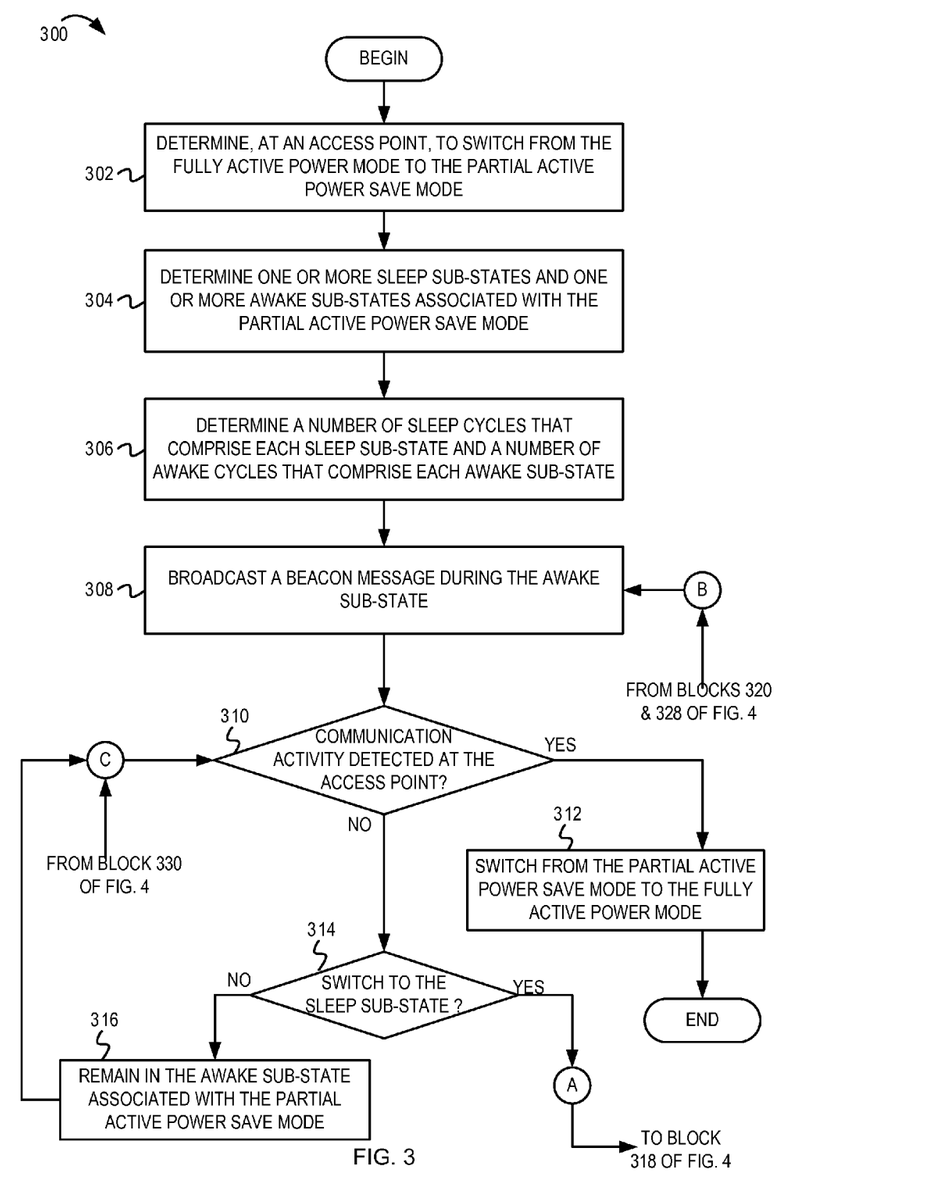
FIG. 3 is a flow diagram illustrating example operations of the access point in a partial active power save mode.
Figure 4:
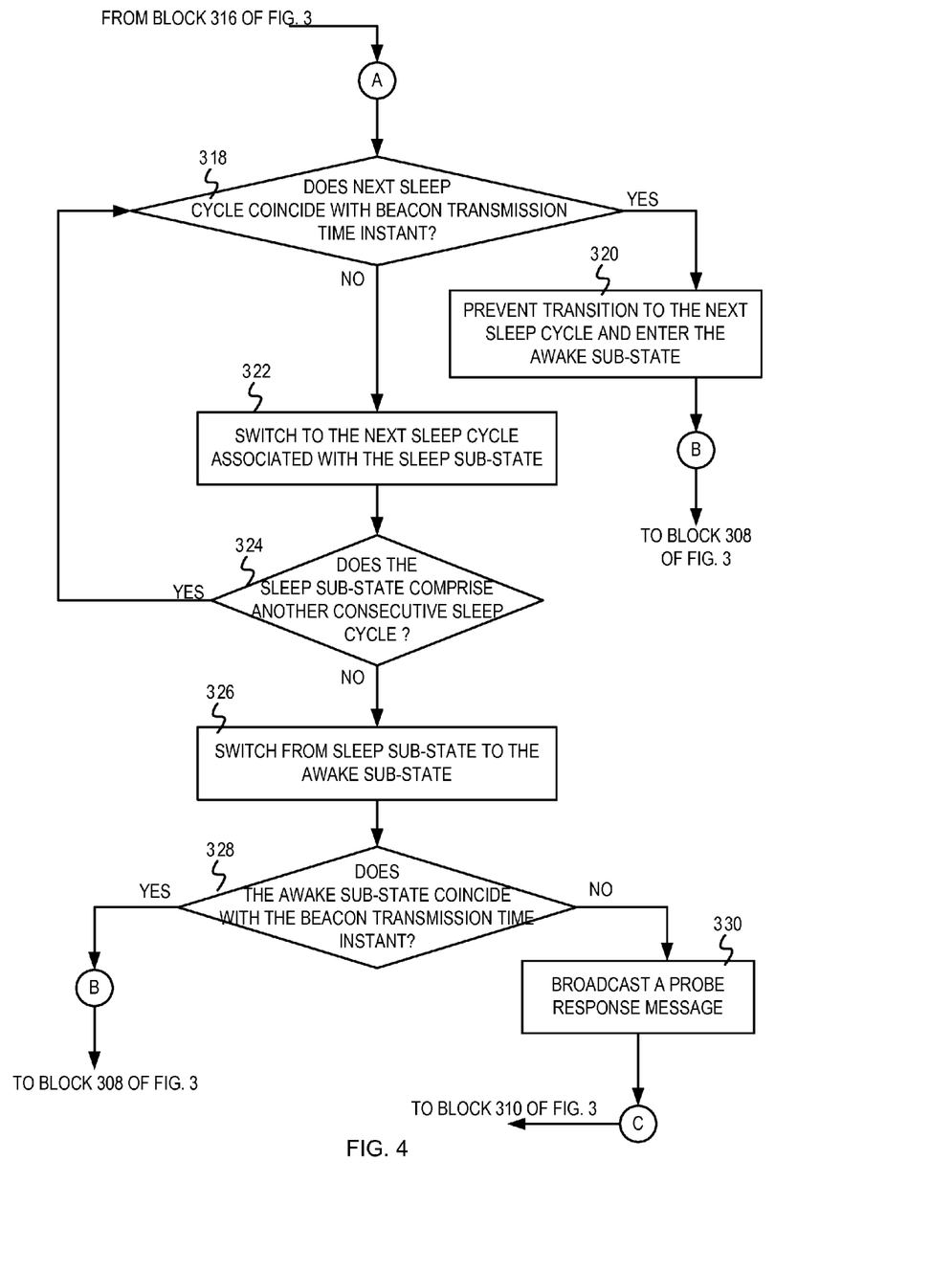
FIG. 4 is a continuation of FIG. 3 and also illustrates example operations of the access point in the partial active power save mode.

FIG. 3 and FIG. 4 depict a flow diagram 300 illustrating example operations of the access point in the partial active power save mode. The flow 300 begins at block 302 in FIG. 3.

At block 302, an access point of a wireless communication network determines to switch from the fully active power mode to the partial active power save mode. For example, as described above with reference to FIGS. 1-2, the power save unit 108 in conjunction with the traffic analysis unit 106 can cause the access point 102 to switch to the partial active power save mode if the access point 102 was idle for the predefined idle time interval threshold. For example, the power save unit 108 can cause the access point 102 to switch to the partial active power save mode if the traffic analysis unit 106 determines that no data/control/management packets were received at or transmitted by the access point 102 (e.g., no probe requests received, no data frames transmitted/received, etc.) for at least the predefined idle time interval threshold and that there is no buffered data for the connected client device 104. As another example, the power save unit 108 can cause the access point 102 to switch to the partial active power save mode if it is determined that no WLAN client devices are connected to the access point 102, or if the WLAN client devices connected to the access point 102 are idle for at least the predefined idle time interval threshold. The flow continues at block 304.

At block 304, one or more sleep sub-states and one or more awake sub-states associated with the partial active power save mode are determined. For example, the power save unit 108 can determine one or more sleep sub-states and one or more awake sub-states associated with the partial active power save mode. As described above, each beacon interval associated with the access point 102 can be divided into consecutive and periodically repeating time intervals during which the access point is inactive (e.g., the sleep sub-state) or partially active (e.g., the awake sub-state). In the partial active power save mode, the access point 102 alternates between the sleep sub-state and the awake sub-state as depicted with reference to timing diagrams 500 and 550 of FIG. 5. In the timing diagram 500, the beacon interval 502 associated with the access point 102 is divided into alternating awake sub-states 508A-508H and sleep sub-states 510A-510H. In the timing diagram 500, both the awake sub-states 508A-508H and the sleep sub-states 510A-510H have the same duration. For example, if the beacon interval 502 comprises 10 power save timeslots, each of the awake sub-states 508A-508H can comprise 1 power save timeslot and each of the sleep sub-states 510A-510H can comprise 1 power save timeslot. As depicted with reference to the timing diagram 500, the access point 102 can remain in the awake sub-state 508A for 1 power save timeslot, switch to the sleep sub-state 510A for the next power save timeslot, switch back to the awake sub-state 508B for the next power save timeslot, and so on. In the timing diagram 550, the beacon interval 502 associated with the access point 102 is divided into alternating awake sub-states 514A-514E and sleep sub-states 516A-516E. In the timing diagram 550, the duration of each of the sleep sub-states is three times the duration of each of the awake sub-states. For example, if the beacon interval 502 comprises 10 power save timeslots, each of the awake sub-states 5148A-514E can comprise 1 power save timeslot and each of the sleep sub-states 516A-516E can comprise 3 power save timeslots. As depicted with reference to the timing diagram 550, the access point 102 can remain in the awake sub-state 514A for 1 power save timeslot, switch to the sleep sub-state 516A for the next 3 power save timeslots, switch back to the awake sub-state 514B for the next power save timeslot, and so on. Referring back to FIG. 3, the flow continues at block 306.

At block 306, a number of sleep cycles that comprise each sleep sub-state and a number of awake cycles that comprise each awake sub-state are determined. For example, the power save unit 108 can determine the number of sleep cycles that comprise each of the sleep sub-states and the number of awake cycles that comprise each of the awake sub-states. A sleep cycle can be considered the smallest time interval that comprises the sleep sub-state and can be determined in terms of a number of power save timeslots. Likewise, the awake cycle can be considered the smallest time interval that comprises the awake sub-state and can be determined in terms of a number of power save timeslots. Referring to the timing diagram 500 of FIG. 5, if the sleep cycle and the awake cycle each comprise 1 power save timeslot, each of the awake sub-states 508A-508H comprise 1 awake cycle and each of the sleep sub-states 510A-510H comprise 1 sleep cycle. Referring to the timing diagram 550 of FIG. 5, if the sleep cycle and the awake cycle each comprise 1 power save timeslot, each of the sleep sub-states 516A-516E comprise 3 sleep cycles and each of the awake sub-states 514A-514E comprise 1 awake cycle.

The duration of each of the sleep sub-states and the duration of each of the awake sub-states can vary depending on the beacon interval associated with the access point 102. Furthermore, the number of sleep cycles that constitute each of the sleep sub-states and the number of awake cycles that constitute each of the awake sub-states may be configurable, and may depend on the operating environment, a maximum number of WLAN client devices that can connect to the access point 102, a number of WLAN client devices currently connected to the access point 102, a current traffic load at the access point 102, analysis of previously collected traffic measurements at different times of the day, and/or other criteria. Also, as described above, when the access point 102 is in the sleep sub-state, the access point 102 may not receive communications from other client devices connected to or attempting to connect to the access point 102. Therefore, in some implementations, the number of sleep cycles that constitute each of the sleep sub-states and the number of awake cycles that constitute each of the awake sub-states may also be calculated based on a maximum allowable length of a packet, a packet transmission rate, a maximum number of retransmissions that can be initiated at the WLAN client device, and/or other criteria. In other words, the duration of each sleep sub-state (e.g., the number of sleep cycles in each sleep sub-state) and the duration of the awake sub-state (e.g., the number of awake cycles in each awake sub-state) can be selected for an optimal balance between discoverability of the access point 102, communication link maintenance with the connected client devices, and power saving at the access point 102. The flow continues at block 308.

At block 308, a beacon message is broadcast during the awake sub-state. For example, the transceiver 110 can broadcast the beacon message during an awake cycle (of the awake sub-state) that corresponds to a beacon message transmission time (e.g., the end of the TBTT). In one implementation, if the beacon interval 502 (shown in FIG. 5) comprises 10 power save timeslots, the access point 102 can transmit a beacon message every 10 power save timeslots (e.g., beacon messages 504 or 506). With reference to the timing diagram 500, on determining to switch to the partial active power save mode, the access point 102 can transmit the beacon message 504 during the first and only awake cycle of the awake sub-state 508A. The power save unit 108 can then cause the access point 102 to switch to the sleep sub-state 510A, then to the awake sub-state 508B, and so on. Likewise, with reference to the timing diagram 550, on determining to switch to the partial active power save mode, the access point 102 can transmit the beacon message 504 during the first and only awake cycle of the awake sub-state 514A. The power save unit 108 can then cause the access point 102 to switch to the sleep sub-state 516A (comprising three sleep cycles), then to the awake sub-state 514B, and so on. The flow continues at block 310.

At block 310, it is determined whether communication activity was detected at the access point. For example, the traffic analysis unit 106 can determine whether communication activity was detected at the access point 102 by determining whether WLAN packets (e.g., data/control/management packets, etc.) were received at the access point 102 from other WLAN devices (e.g., other access points, connected WLAN client devices, WLAN devices attempting to connect to the access point 102, etc.). The traffic analysis unit 106 can also determine whether the access point 102 is scheduled to transmit data/control/management packets to one or more other WLAN devices in the wireless communication network 100. It is noted that in determining whether communication activity was detected at the access point 102, the traffic analysis unit 106 may not take the periodic transmission of beacon messages or broadcast probe response messages (in response to switching to the awake sub-state) into consideration. Furthermore, it is noted that the traffic analysis unit 106 may determine whether communication activity was detected at the access point 102 only when the access point 102 is operating in the awake sub-state associated with the partial active power save mode. Because the traffic analysis unit 106 may be disabled during the sleep sub-state, the traffic analysis unit 106 may not detect any communication activity at the access point 102 during the sleep sub-state. If it is determined that communication activity was detected at the access point 102, the flow continues at block 312. Otherwise, the flow continues at block 314.

At block 312, the access point switches from the partial active power save mode to the fully active power mode. The flow 300 moves from block 310 to block 312 if the traffic analysis unit 106 determines that communication activity was detected at the access point 102 (when the access point 102 was operating in the partial active power save mode). Accordingly, the power save unit 108 can cause processing components of the access point 102 to switch from the partial active power save mode to the fully active power mode. In the fully active power mode, the access point 102 can respond to communications received from WLAN client devices, transmit WLAN packets to the WLAN client devices, establish a WLAN connection with one or more WLAN client devices, etc. As described above with reference to FIG. 2, the traffic analysis unit 106 can continue to analyze the communication activity associated with the access point 102. The power save unit 108 can cause the processing components of the access point 102 to switch from the fully active power mode to the partial active power save mode if no communication activity is detected at the access point idle time interval for at least the predefined idle time interval threshold. From block 312, the flow ends.

At block 314, it is determined whether to switch to the sleep sub-state associated with the partial active power save mode. For example, the power save unit 108 can determine whether the access point 102 should switch from the awake sub-state to the sleep sub-state. In some implementations, the power save unit 108 can keep track of the number of awake cycles that have been initiated within the awake sub-state. For example, if the power save unit 108 determines that the access point 102 should initiate 2 awake cycles per awake sub-state (i.e., remain in the active state for 2 power save timeslots), the power save unit 108 can maintain a counter to determine when the 2 awake cycles have elapsed or can maintain a timer to determine when/whether to transition from the awake sub-state to the sleep sub-state. In another implementation, at the end of each awake cycle, the power save unit 108 can determine whether the access point 102 should transition from the awake sub-state to the sleep sub-state. If it is determined that the access point 102 should switch to the sleep sub-state, the flow continues at block 318 in FIG. 4. Otherwise, the flow continues at block 316.

At block 316, the access point remains in the awake sub-state associated with the partial active power save mode. The flow 300 moves from block 314 to block 316 if the power save unit 108 determines that the access point 102 should not switch from the awake sub-state to the sleep sub-state. In one implementation, the power save unit 108 can update a counter to indicate the number of awake cycles that have been initiated for the current awake sub-state and can cause the processing components of the access point 102 to remain in the active mode. The flow 300 loops back to block 310 where the power save unit 108 continues to determine whether communication activity was detected at the access point 102.

At block 318 in FIG. 4, it is determined whether the next sleep cycle coincides with a beacon transmission time instant. The flow 300 moves from block 314 in FIG. 3 to block 318 in FIG. 4 if the power save unit 108 determines that the access point 102 should switch to the sleep sub-state. The power save unit 108 can also determine whether the next sleep cycle coincides with the beacon transmission time instant. In one implementation, the power save unit 108 can receive a trigger that indicates the end of the beacon interval and that indicates that the beacon message should be transmitted. In another implementation, the power save unit 108 can maintain a timer set to a time period of 1 power save timeslot to determine the beginning/end of each sleep cycle within each sleep sub-state. At the end of each power save timeslot, the power save unit 108 can determine whether the beginning of the next power save timeslot coincides with the time to transmit the beacon message (e.g., the target beacon transmission time or TBTT). If it is determined that the next sleep cycle coincides with the beacon transmission time instant, the flow continues at block 320. Otherwise, the flow continues at block 322.

At block 320, transition to the next sleep cycle is prevented and the access point switches to the awake sub-state. The flow 300 moves from block 318 in FIG. 4 to block 320 in FIG. 4 if the power save unit 108 determines that the next sleep cycle coincides with the beacon transmission time instant. Consequently, the power save unit 108 can prevent the access point 102 from initiating the next sleep cycle. Instead, the power save unit 108 can cause the access point 102 to abort the next sleep cycle, switch to the awake sub-state, and initiate the first awake cycle that constitutes the awake sub-state (in order to transmit the beacon message). With reference to the timing diagram 550 of FIG. 5, the end of the beacon interval 502 coincides with the second sleep cycle of the sleep sub-state 516C. In other words, the power save unit 108 determines that the access point 102 is scheduled to transmit the beacon message 506 during the second sleep cycle of the sleep sub-state 516C. Therefore, instead of remaining in the sleep sub-state for three sleep cycles (as previously depicted with reference to the sleep sub-states 516A and 516B), the power save unit 108 aborts the second sleep cycle and causes the access point 102 switch to the awake sub-state 514D (after only 1 sleep cycle in the sleep sub-state 516C). The access point 102 then broadcasts the beacon message 506 during the awake sub-state 514D. After the access point 102 broadcasts the beacon message 506, the power save unit 108 can cause the access point 102 to switch to the sleep sub-state 516D for the designated 3 sleep cycles. Referring back to FIG. 4, following block 320, the flow 300 loops back to block 308 in FIG. 3, where the transceiver 110 transmits the beacon message and the power save unit 108 determines whether to remain in the awake sub-state or to switch back to the sleep sub-state.

At block 322, the access point switches to the next sleep cycle associated with the sleep sub-state. The flow 300 moves from block 318 to block 322 if the power save unit 108 determines that the next sleep cycle does not coincide with the beacon transmission time instant. For example, if the access point 102 is already in the sleep sub-state, the power save unit 108 can cause the access point 102 to enter the next sleep cycle of the sleep sub-state. In other words, if the access point 102 is already in the sleep sub-state, the power save unit 108 may not provide any triggers to cause the processing components of the access point 102 to change power states. As another example, if the access point is in the awake sub-state, the power save unit 108 can provide triggers to cause the processing components of the access point 102 to initiate the first sleep cycle that constitutes the sleep sub-state. The flow continues at block 324.

At block 324, it is determined whether the sleep sub-state comprises another consecutive sleep cycle. For example, the power save unit 108 can access a sleep cycle counter and/or timer associated with the access point 102 to determine whether the sleep sub-state comprise another consecutive sleep cycle. With reference to the timing diagram 500 of FIG. 5, each of the sleep sub-states comprises only one sleep cycle. Therefore, at the end of one sleep cycle (e.g., the sleep cycle of the sleep sub-state 510B), the power save unit 108 can determine that the sleep sub-state 510B does not comprise another sleep cycle. With reference to the timing diagram 550 of FIG. 5, each of the sleep sub-states comprises three sleep cycles. Therefore, at the end of one sleep cycle (e.g., the first sleep cycle of the sleep sub-state 516B), the power save unit 108 can determine that the sleep sub-state 516B comprises another sleep cycle. If it is determined that the sleep sub-state comprise another consecutive sleep cycle, the flow loops back to block 318 where the power save unit 108 determines whether the next sleep cycle coincides with the beacon transmission time instant. If it is determined that the sleep sub-state does not comprise another consecutive sleep cycle, the flow continues at block 326.

At block 326, the access point switches from the sleep sub-state to the awake sub-state. The flow 300 moves from block 324 to block 326 if the power save unit 108 determines that the sleep sub-state does not comprise another consecutive sleep cycle. Consequently, the power save unit 108 can cause power to be provided to one or more processing components of the access point 102 (e.g., low power). The power save unit 108 can enable the processing components of the access point 102 to switch to the awake sub-state and to initiate the first awake cycle of the awake sub-state. The flow continues at block 328.

Figure 5:
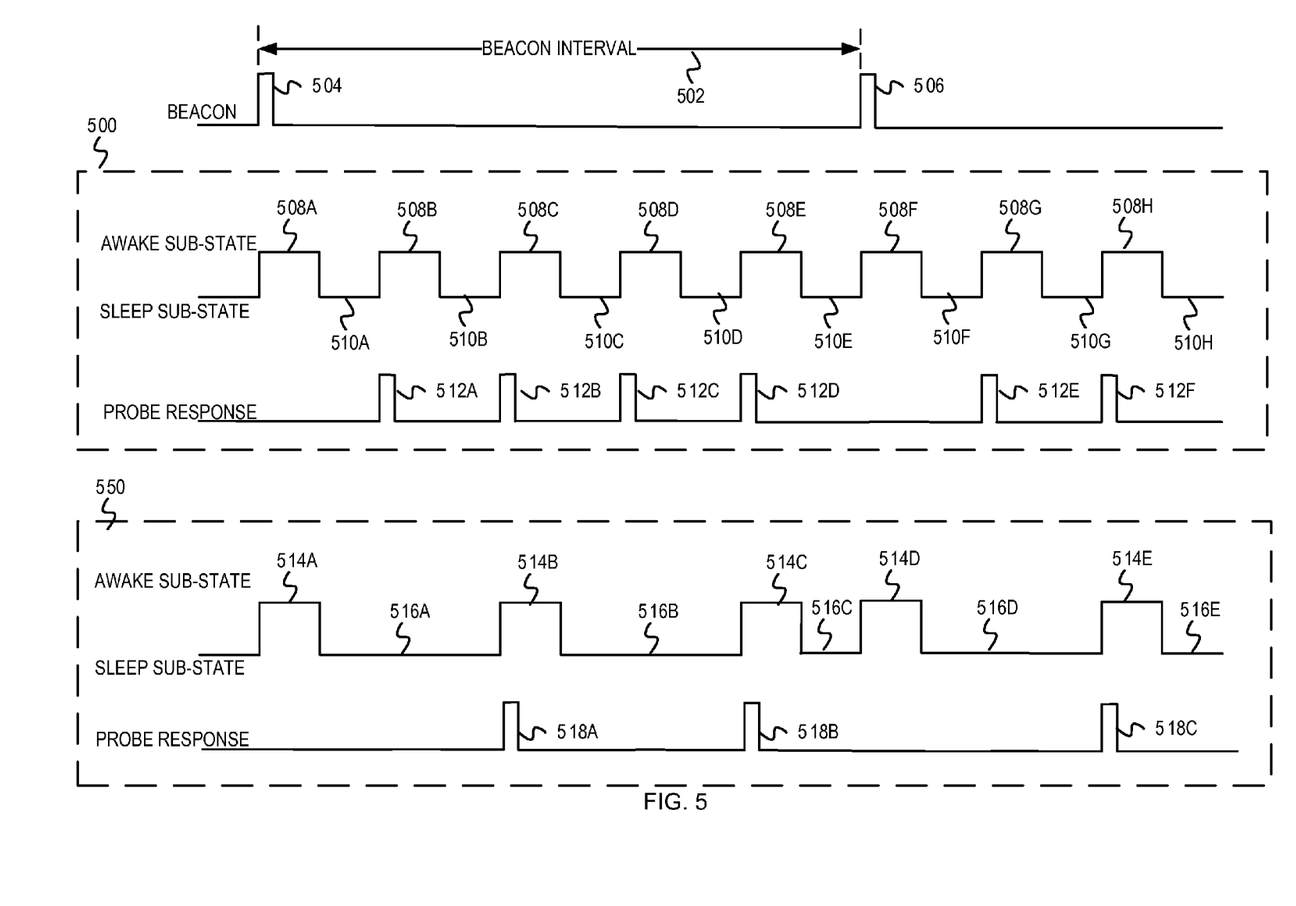
FIG. 5 is a timing diagram illustrating example operations of the access point in the partial active power save mode.

At block 328, it is determined whether the awake cycle coincides with the beacon transmission time instant. For example, the power save unit 108 can determine whether the start of the awake cycle (initiated at block 326) coincides with the beacon transmission time instant. In one implementation, the power save unit 108 can receive a trigger that indicates the end of the beacon interval and that indicates that the beacon message should be transmitted. In another implementation, the power save unit 108 can maintain a timer set to a time period of 1 power save timeslot to determine the beginning/end of each awake cycle within each awake sub-state. At the beginning/end of each power save timeslot, the power save unit 108 can determine whether the start of the next power save timeslot coincides with the time to transmit the beacon message. As depicted by the timing diagram 500, the power save unit 108 determines that the end of the beacon interval 502 coincides with the awake cycle of the awake sub-state 508F. In other words, the power save unit 108 determines that the access point 102 is scheduled to transmit the beacon message 506 during the awake sub-state 508F. If it is determined that the awake cycle coincides with the beacon transmission time instant, the flow continues at block 308 in FIG. 3, where the access point 102 broadcasts the beacon message. If it is determined that the awake cycle does not coincide with the beacon transmission time instant, the flow continues at block 330.

At block 330, the access point broadcasts a probe response message. For example, the power save unit 108 can cause the transceiver 110 to broadcast the probe response message during the first awake cycle of the awake sub-state, in response to determining that the awake cycle does not coincide with the beacon transmission time instant. In some implementations, the power supply to the processing components of the access point 102 may be disabled (i.e., the access point 102 may be in the off or inactive state) during the sleep sub-state. Therefore, the access point 102 may not receive WLAN packets transmitted by other WLAN devices during the sleep sub-state. On switching from the sleep sub-state to the awake sub-state, the access point 102 can broadcast the probe response message to pre-empt retransmission of probe request messages that may not have been received by the access point 102 and to improve the discoverability of the access point 102. In other words, if the WLAN client device 104 transmitted a probe request message to the access point 102 while the access point 102 was in the sleep sub-state, the access point 102 can enable the WLAN client device 104 to discover and connect to the access point 102 by broadcasting the probe response message on switching to the awake sub-state. With reference to the timing diagram 500 of FIG. 5, the access point 102 broadcasts probe response messages 512A, 512B, 512C, and 512D during the awake sub-states 508B, 508C, 508D, and 508E, respectively. The access point 102 does not broadcast any probe response message (but instead broadcasts the beacon message 506) during the awake sub-state 508F because the awake sub-state 508F coincides with the end of the beacon interval (or the TBTT). Subsequently, the access point 102 broadcasts probe response messages 512E and 512F during the awake sub-states 508G and 508H, respectively. With reference to the timing diagram 550 of FIG. 5, the access point 102 broadcasts the probe response message 518A, 518B, and 518C during the awake sub-states 514B, 514C, and 514E, respectively. From block 330, the flow loops back to block 310 of FIG. 3, where the power save unit 108 continues to determine whether communication activity was detected at the access point 102.

It should be understood that FIGS. 1-5 are examples meant to aid in understanding embodiments and should not be used to limit embodiments or limit scope of the claims. Embodiments may perform additional operations, fewer operations, operations in a different order, operations in parallel, and some operations differently. For example, although FIG. 5 depicts one example timing diagram 500 where the awake sub-state comprises one awake cycle and the sleep sub-state comprises one sleep cycle, and a second example timing diagram 550 where the awake sub-state comprises one awake cycle and the sleep sub-state comprises three sleep cycles, embodiments are not so limited. In other embodiments, the awake sub-state can comprise any suitable number of awake cycles (e.g., 2 awake cycles) and the sleep sub-state can comprise any suitable number of sleep cycles (e.g., 4 sleep cycles). Furthermore, in some implementations, the beacon interval 502 may comprise only one awake sub-state and only one sleep sub-state. In this scenario, the beacon transmission time interval can coincide with the start of each awake sub-state. Therefore, in this scenario, when the access point 102 switches from the sleep sub-state to the awake sub-state, the access point 102 transmits the beacon message instead of the probe response message.

It is noted that in some implementations, the partial active power save mode may be enabled or disabled at the access point 102. If the partial active power save mode is disabled, the access point 102 may continuously remain in the fully active power mode and may not switch to the partial active power save mode (and consequently the sleep sub-state). In other implementations, the partial active power save mode may be permanently enabled at the access point 102, so that the access point 102 is always trying to switch from the fully active power mode to the partial active power save mode for power conservation.

Although FIGS. 1-5 describe operations for power conservation at the access point 102, embodiments are not so limited. In other implementations, a group owner in a peer-to-peer network (e.g., P2PGO) or another coordinating device in other suitable communication network can execute the operations described in FIGS. 1-5 for switching between the fully active power mode and the partial active power save mode to conserve power at the group owner (or other coordinating device).

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider)

Figure 6:
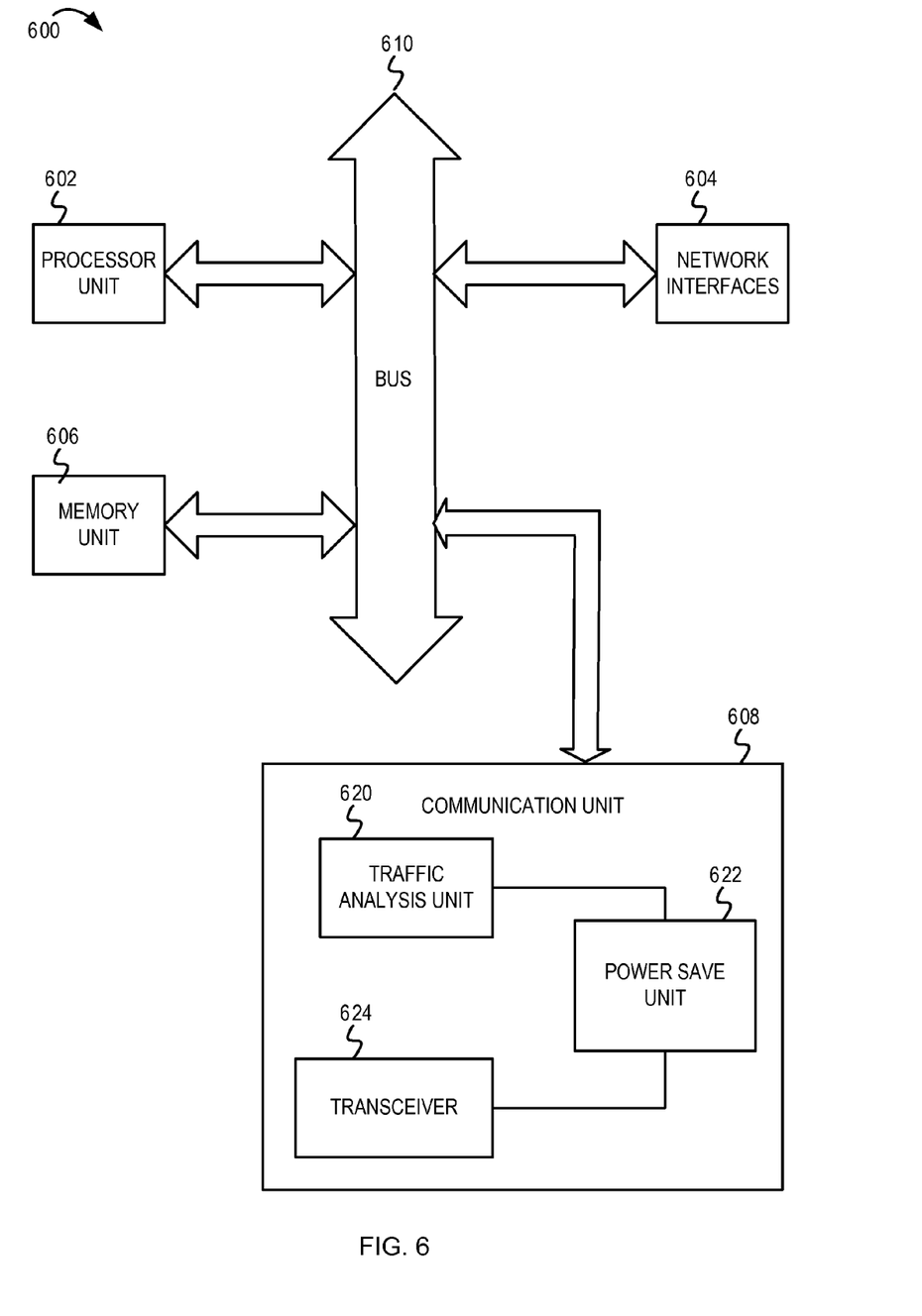
FIG. 6 is an example block diagram of one embodiment of an electronic device including an access point power save mechanism in a wireless communication network.

FIG. 6 is a block diagram of one embodiment of an electronic device 600 including an access point power save mechanism. In some implementations, the electronic device 600 may be one of a personal computer (PC), a laptop, a netbook, a mobile phone, a personal digital assistant (PDA), or other electronic systems comprising a WLAN device configured as an access point. In some implementations, the electronic device 600 can be a standalone WLAN access point configured to establish a WLAN communication link with one or more WLAN client devices. The electronic device 600 includes a processor unit 602 (possibly including multiple processors, multiple cores, multiple nodes, and/or implementing multi-threading, etc.). The electronic device 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 also includes a bus 610 (e.g., PCI, ISA, PCI-Express, HyperTransport®, InfiniBand®, NuBus, AHB, AXI, etc.), and network interfaces 604 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, etc.).

The electronic device 600 also includes a communication unit 608. The communication unit 608 comprises a transceiver 624, a power save unit 622, and a traffic analysis unit 620. The communication unit 608 implements functionality to determine when the electronic device 600 (e.g., the access point) should switch from the fully active power mode to the partial active power save mode and vice versa, as described above with reference to FIGS. 1-5. When the electronic device 600 operates in the partial active power save mode, the communication unit 608 can also implement functionality to cause the access point to switch between an awake sub-state associated with the partial active power save mode and a sleep sub-state associated with the partial active power save mode. On switching to the awake sub-state, the communication unit 608 can broadcast probe response messages (or beacon messages) to maintain connectivity to WLAN devices and to probe for missed WLAN packets, as described above with reference to FIGS. 3-5. Any one of these functionalities may be partially (or entirely) implemented in hardware and/or on the processor unit 602. For example, the functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the memory unit 606, and the network interfaces 606 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the inventive subject matter is not limited to them. In general, an access point power save mechanism as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
switching from an active power mode to a power save mode at an access point, in response to not detecting communication activity associated with the access point for a predetermined idle time interval threshold;
initiating a sleep sub-state and an awake sub-state during the power save mode of the access point;
determining whether the awake sub-state coincides with a beacon transmission time instant associated with the access point;

broadcasting a probe response message associated with the access point during the awake sub-state, in response to determining that the awake sub-state does not coincide with the beacon transmission time instant; and broadcasting a beacon message associated with the access point during the awake sub-state, in response to determining that the awake sub-state coincides with the beacon transmission time instant.

2. The method of claim 1, wherein the sleep sub-state and the awake sub-state are consecutive and periodically repeating time intervals during the power save mode.

3. The method of claim 1, wherein the communication activity associated with the access point comprises data packets received at the access point, management packets received at the access point, data packets scheduled to be transmitted by the access point, and management packets scheduled to be transmitted by the access point.

4. The method of claim 1, further comprising:
in response to determining that the awake sub-state has elapsed, determining whether to initiate the sleep sub-state based, at least in part, on whether the sleep sub-state coincides with the beacon transmission time instant;
initiating another awake sub-state for broadcasting the beacon message, in response to determining that the sleep sub-state coincides with the beacon transmission time instant; and
initiating the sleep sub-state, in response to determining that the sleep sub-state does not coincide with the beacon transmission time instant.

5. The method of claim 4, wherein said initiating the sleep sub-state further comprises:
determining that the sleep sub-state of the power save mode comprises a first sleep cycle;
determining whether the first sleep cycle coincides with the beacon transmission time instant;
in response to determining that the first sleep cycle coincides with the beacon transmission time instant,
initiating the awake sub-state at the access point for broadcasting the beacon message;
in response to determining that the first sleep cycle does not coincide with the beacon transmission time instant,
initiating the first sleep cycle of the sleep sub-state at the access point;
determining whether to initiate a second sleep cycle of the sleep sub-state;
initiating the second sleep cycle of the sleep sub-state at the access point, in response to determining to initiate the second sleep cycle of the sleep sub-state; and
initiating the awake sub-state of the power save mode, in response to determining not to initiate the second sleep cycle of the sleep sub-state.

6. The method of claim 1,
wherein the sleep sub-state comprises a time interval during which the access point is configured in an inactive power state or during which processing components of the access point are disabled; and
wherein the awake sub-state comprises a time interval during which the access point is configured in an active power state for maintaining link connectivity and for indicating presence of the access point.

7. The method of claim 1, wherein said initiating the sleep sub-state and the awake sub-state during the power save mode further comprises:
subdividing a beacon interval associated with the access point during the power save mode into a plurality of power save time intervals,
wherein the sleep sub-state comprises a sleep cycle that comprises one of the plurality of power save time intervals, and
wherein the awake sub-state comprises an awake cycle that comprises one of the plurality of power save time intervals.

8. The method of claim 1, further comprising:
determining whether communication activity was detected at the access point during the awake sub-state of the power save mode;
causing the access point to switch from the power save mode to an active power mode, in response to determining that communication activity was detected at the access point; and
causing the access point to continue to remain in the power save mode, in response to determining that communication activity was not detected at the access point.

9. The method of claim 8, wherein said determining whether communication activity was detected at the access point during the awake sub-state comprises at least one of:
determining whether the access point is scheduled to initiate a packet transmission,
determining whether a packet reception was detected at the access point, and
determining whether a request for data intended for a client station associated with the access point was detected at the access point.

10. The method of claim 1, further comprising:
determining whether communication activity was not detected at the access point configured in the active power mode for the predefined idle time interval threshold;
switching from the active power mode to the power save mode, in response to determining that communication activity was not detected at the access point for the predefined idle time interval threshold; and
causing the access point to remain in the active power mode, in response to determining that communication activity was detected at the access point during the predefined idle time interval threshold.

11. The method of claim 1, wherein the access point comprises a wireless local area network (WLAN) access point.

12. A network device comprising:
a processor;
a network interface coupled with the processor; and
a power save unit coupled with the processor and with the network interface, the power save unit operable to:
switch from an active power mode to a power save mode, in response to not detecting communication activity associated with the network device for a predetermined idle time interval threshold;
initiate a sleep sub-state and an awake sub-state during the power save mode of the network device;
determine whether the awake sub-state coincides with a beacon transmission time instant associated with the network device;
broadcast a probe response message associated with the network device during the awake sub-state, in response to the power save unit determining that the awake sub-state does not coincide with the beacon transmission time instant; and
broadcast a beacon message associated with the network device during the awake sub-state, in response to the power save unit determining that the awake sub-state coincides with the beacon transmission time instant.

13. The network device of claim 12, wherein the sleep sub-state and the awake sub-state are consecutive and periodically repeating time intervals during the power save mode.

14. The network device of claim 12, wherein the communication activity associated with the network device comprises data packets received at the network device, management packets received at the network device, data packets scheduled to be transmitted by the network device, and management packets scheduled to be transmitted by the network device.

15. The network device of claim 12, wherein the power save unit is further operable to:
   in response to the power save unit determining that the awake sub-state has elapsed, determine whether to initiate the sleep sub-state based, at least in part, on the power save unit determining whether the sleep sub-state coincides with the beacon transmission time instant;
   initiate another awake sub-state for broadcasting the beacon message, in response to the power save unit determining that the sleep sub-state coincides with the beacon transmission time instant; and
   initiate the sleep sub-state, in response to the power save unit determining that the sleep sub-state does not coincide with the beacon transmission time instant.

16. The network device of claim 15, wherein the power save unit operable to initiate the sleep sub-state further comprises the power save unit operable to:
   determine that the sleep sub-state of the power save mode comprises a first sleep cycle;
   determine whether the first sleep cycle coincides with the beacon transmission time instant;
   in response to the power save unit determining that the first sleep cycle coincides with the beacon transmission time instant,
      initiate the awake sub-state at the network device for broadcasting the beacon message;
   in response to the power save unit determining that the first sleep cycle does not coincide with the beacon transmission time instant,
      initiate the first sleep cycle of the sleep sub-state at the network device;
      determine whether to initiate a second sleep cycle of the sleep sub-state;
      initiate the second sleep cycle of the sleep sub-state at the network device, in response to the power save unit determining to initiate the second sleep cycle of the sleep sub-state; and
      initiate the awake sub-state of the power save mode, in response to the power save unit determining not to initiate the second sleep cycle of the sleep sub-state.

17. The network device of claim 12, wherein the power save unit is further operable to:
   determine whether communication activity was detected at the network device during the awake sub-state of the power save mode;
   cause the network device to switch from the power save mode to an active power mode, in response to the power save unit determining that communication activity was detected at the network device; and
   cause the network device to continue to remain in the power save mode, in response to the power save unit determining that communication activity was not detected at the network device.

18. A non-transitory machine-readable storage medium having instructions stored therein, which when executed by a processor causes the processor to perform operations that comprise:
   switching from an active power mode to a power save mode, in response to not detecting communication activity associated with an access point for a predetermined idle time interval threshold;
   initiating a sleep sub-state and an awake sub-state during the power save mode, wherein the sleep sub-state and the awake sub-state are consecutive and periodically repeating time intervals during the power save mode;
   determining whether the awake sub-state coincides with a beacon transmission time instant associated with the access point;
   broadcasting a probe response message associated with the access point during the awake sub-state, in response to determining that the awake sub-state does not coincide with the beacon transmission time instant; and
   broadcasting a beacon message associated with the access point during the awake sub-state, in response to determining that the awake sub-state coincides with the beacon transmission time instant.

19. The non-transitory machine-readable storage medium of claim 18, wherein the communication activity associated with the access point comprises data packets received at the access point, management packets received at the access point, data packets scheduled to be transmitted by the access point, and management packets scheduled to be transmitted by the access point.

20. The non-transitory machine-readable storage medium of claim 18, wherein the operations further comprise:
   in response to determining that the awake sub-state has elapsed, determining whether to initiate the sleep sub-state based, at least in part, on whether the sleep sub-state coincides with the beacon transmission time instant;
   initiating another awake sub-state for broadcasting the beacon message, in response to determining that the sleep sub-state coincides with the beacon transmission time instant; and
   initiating the sleep sub-state, in response to determining that the sleep sub-state does not coincide with the beacon transmission time instant.

21. The non-transitory machine-readable storage medium of claim 20, wherein said operation of initiating the sleep sub-state further comprises:
   determining that the sleep sub-state of the power save mode comprises a first sleep cycle;
   determining whether the first sleep cycle coincides with the beacon transmission time instant;
   in response to determining that the first sleep cycle coincides with the beacon transmission time instant,
      initiating the awake sub-state at the access point for broadcasting the beacon message;
   in response to determining that the first sleep cycle does not coincide with the beacon transmission time instant,
      initiating the first sleep cycle of the sleep sub-state at the access point;
      determining whether to initiate a second sleep cycle of the sleep sub-state;
      initiating the second sleep cycle of the sleep sub-state, in response to determining to initiate the second sleep cycle of the sleep sub-state; and
      initiating the awake sub-state of the power save mode, in response to determining not to initiate the second sleep cycle of the sleep sub-state.

* * * * *